UNITED STATES PATENT OFFICE.

HUGO BREWER, OF DUISBURG, GERMANY.

PROCESS OF TREATING ZINC-SULFID ORES.

SPECIFICATION forming part of Letters Patent No. 586,159, dated July 13, 1897.

Application filed September 12, 1896. Serial No. 605,654. (No specimens.)

*To all whom it may concern:*

Be it known that I, HUGO BREWER, a subject of the German Emperor, residing at 5 Grünstrasse, Duisburg, Germany, have invented certain new and useful Improvements in and Relating to the Treatment of Zinc Ores or Ore Residues in the Production of Zinc, Chlorin, Sodium Sulfate, and other Products; and I do hereby declare the following to be a clear and exact description of the invention.

My invention has relation to the utilization or working up of lyes resulting from the lixiviation of chlorinated roasted sulfid ores in the chlorinating roasting of which sodium chlorid is employed. In the various processes proposed for the utilization or working up of these lyes not only has the sodium chlorid been lost, but very undesirable and troublesome or deleterious final lyes have invariably been obtained, so that as a rule the utilization of these lyes has been deemed impracticable or of little advantage, and this is especially the case in the efforts made to the utilization of lyes resulting from the lixiviation of chlorinated roasted zinkiferous sulfate lyes. In Letters Patent of the United States granted to me August 18, 1895, No. 544,499, I have described a process for successfully and economically utilizing these lyes, thereby not only recovering the metallic constituents, together with chlorin, but also the sodium chlorid for further use in the chlorinating roasting of the ore, and whereby a final lye is obtained that consists essentially of a solution of calcium chlorid. In the industrial application of this process it may become desirable and advantageous to obtain sodium sulfate (Glauber salt) also as by-product, and this is the object of my present invention.

In carrying out this my invention I add to the lye resulting from the lixiviation of a chlorinated roasted sulfid ore or a residuum of such—as, for instance, a chlorinated roasted zinc-sulfid ore—sufficient sodium chlorid to form a saturated solution; nay, I prefer to add sufficient of the chlorid so that there will be an excess thereof in the lye. The object of this is to facilitate the crystallizing out of the sodium, which has been converted into a sulfate in the form of a pure sodium sulfate, (Glauber salt,) as I have found that the sodium sulfate will more readily crystallize out of a solution containing an excess of sodium chlorid than it would from a solution merely saturated with sodium chlorid, though good results are also obtained with such saturated solution, and this is the case whether the lye is saturated with the sulfate or not, the crystallizing out of the sulfate being effected by refrigeration of the lye. In this manner I can avoid the labor, time, and expense involved in the removal of the sodium sulfate by evaporation, which is of importance, because these lyes usually contain iron, in the form of a chlorid of course, and sometimes in such quantities as to amount to saturation.

The action of the sodium chlorid is a mere physical one and may be explained in that it reduces the solubility of the sodium sulfate, so that when there is an excess of the chlorid present in the lye the sodium sulfate will more readily crystallize out than would be the case otherwise. After the sodium sulfate has been crystallized out of and removed from the mother-lye a sufficient quantity of calcium-chlorid lye is added thereto to convert the sulfuric acid, bound in the sulfates still present and formed in the chlorinating roasting process, into calcium sulfate, which is precipitated. The lye is now separated from the calcium-sulfate precipitate, and if silver is present in said lye it can be precipitated by well-known means—as, for instance, by means of iodide of sodium or potassium—and removed from the lye, after which the iron, in so far as this is present in the form of a ferro salt, is converted into a hydroxid by means of carbonate of lime in presence of atmospheric air, the reaction taking place in accordance with the following equation:

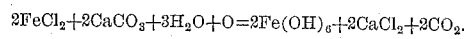

$$2FeCl_2 + 2CaCO_3 + 3H_2O + O = 2Fe(OH)_3 + 2CaCl_2 + 2CO_2.$$

After removal of the iron hydroxid the lye containing the chlorin of the iron salt in the form of calcium chlorid may now be freed from nickel, cobalt, and manganese, if these or any of them be present, in a well-known manner—as, for instance, by means of chlorin, but preferably by means of hypochlorite of lime—whereby said metals are precipitated in the form of oxids, an equivalent quantity of calcium chlorid being formed, which goes over into the solution.

The precipitation of the metals last referred to takes place in accordance with the following equations:

Nickel: $2NiO + CaCl_2O = Ni_2O_3 + CaCl_2$.

Cobalt: $2CoO + CaCl_2O = Co_2O_3 + CaCl_2$.

Manganese: $MnO + CaCl_2O = MnO_2 + CaCl_2$.

The lye, when freed from these metals, consists, essentially, of a solution of zinc chlorid, sodium chlorid, and calcium chlorid and is concentrated by evaporation for electrolytical treatment, whereby the small amount or traces of sulfate of sodium still present is separated and approximately the whole of the sodium obtained in a solid form.

The fact that some of the zinc chlorid may go over into the sodium chlorid is of no consequence, since said zinc chlorid is not lost because of the use of the sodium chlorid in the chlorinating roasting of fresh batches of ore.

After removal of the sodium chlorid from the concentrated lye the latter will consist, essentially, of a solution of zinc chlorid and calcium chlorid, together with some sodium chlorid, and from this lye the zinc is extracted by electrolysis, under simultaneous production of chlorin, and a final lye obtained that contains substantially nothing but calcium chlorid, as set forth in my Letters Patent hereinbefore referred to. This calcium chlorid and any non-converted zinc chlorid that may be present in the final lye are utilized in the process.

Should the mother-lye contain copper in sufficient quantity to warrant its extraction or to render the same necessary, the lye is treated in the manner described in relation to the extraction of zinc with this exception, that either before or after the addition to the lye of the chlorid of lime the silver and copper are both eliminated successively, the former as described or in any other well-known manner and the copper by means of metallic iron. When, however, copper is present in large quantity, it may be extracted electrolytically under simultaneous production of chlorin, and the unconverted copper remaining may then be precipitated as set forth, after which the lye is further treated as above set forth.

The process is of course applicable to cupriferous lyes rich in copper, and in this case the precipitation of the copper by means of metallic iron will result in a solution containing a large proportion of the latter metal, so that there will also be present a large quantity of calcium chlorid after the iron has been precipitated, so that this lye can be used for the conversion of the sulfates in the mother-lye. The excess of sodium chlorid, together with the sodium formed, is continuously recovered at the same stage of the process and is always present in the lye.

It is well known that the direct evaporation of lyes containing iron chlorid involves great technical difficulties, and this is avoided by the described process, while the evaporation of sodium-chlorid lyes can readily be effected without injury to the evaporating apparatus, so that instead of evaporating the lyes after the addition thereto of calcium chlorid and the separation therefrom of the gypsum the iron salts can be converted into hydroxids by means of carbonate of lime and removed, after which the lye is concentrated, &c., as above described and as described in my aforementioned patent.

Having thus described my invention, what I claim as new therein, and desire to secure by Letters Patent, is—

1. In a process of treating zinkiferous sulfate lyes resulting from the lixiviation of chlorinated roasted zinc-sulfid ores, adding sodium chlorid to such lye to saturation or in excess, and crystallizing out the resulting sodium sulfate (Glauber salt) by refrigeration as a by-product, for the purpose set forth.

2. The herein-described process of treating zinkiferous sulfate lyes resulting from the lixiviation of chlorinated roasted zinc-sulfid ores, which consists in treating the lye with sodium chlorid to saturation or in excess, crystallizing out the sodium sulfate (Glauber salt) formed by refrigeration, treating the lye after removal of the sulfate with calcium chlorid, removing the calcium sulfate formed, eliminating from the lye the silver, if any be present, then the iron, and successively other metals if present, as nickel, cobalt and manganese in the manner substantially as described, concentrating the lye by heat, eliminating the sodium chlorid formed, treating the resultant lye electrolytically for the extraction of the zinc under simultaneous production of chlorin, whereby a final lye is obtained consisting essentially of a solution of calcium chlorid, and recovering the latter for use in the process, substantially as set forth.

In testimony whereof I have hereunto signed my name in the presence of two subscribing witnesses.

HUGO BREWER.

Witnesses:
 GEORGE GIFFORD,
 ALBERT GRAETER.